Nov. 2, 1954  G. E. MATHIAS ET AL  2,693,560
PLURAL OUTPUT GENERATOR IN PLURAL MOTOR CONTROL
Filed Sept. 30, 1952  5 Sheets-Sheet 1

Fig.1.

WITNESSES:
E.A. M?Closkey.
Urban H. Faulion

INVENTORS
Gerald E. Mathias
and William T. Hunt, Jr.
BY
Paul E. Friedemann
ATTORNEY

Fig. 2.

United States Patent Office 2,693,560
Patented Nov. 2, 1954

2,693,560

PLURAL OUTPUT GENERATOR IN PLURAL MOTOR CONTROL

Gerald E. Mathias, Williamsville, N. Y., and William T. Hunt, Jr., Apex, N. C., assignors to Westinghouse Electric Corporation, East Pittsburgh, Pa., a corporation of Pennsylvania Application September 30, 1952, Serial No. 312,288

12 Claims. (Cl. 318—100)

This invention relates to electric control apparatus and its application to control systems.

Restrictions are often placed on the space that control equipment may occupy or the weight that it may have or a combination of both. One typical example of this is the main trolley and control house on an ore bridge. The trolley house must be accelerated and then retarded again each time the material handling bucket is moved in or out. Additional control equipment requires a longer control house which means more weight due to equipment and also due to the large house.

Systems may require that more than one function be simultaneously regulated. Quite often one regulating generator is to perform a current limit function and another is used in conjunction with it as a counter E. M. F. regulator. At the same time, it may be desirable to balance the load between two generators on a common bus supplying this load or between two motors coupled to the same load. This normally requires an additional regulating generator.

It is an object of this invention to provide a regulating generator which has at least two separate, substantially independent outputs.

Another object of this invention is to provide a control apparatus for at least two electric motors whereby the motors are controlled in dependence on a selected control quantity and also in accordance with the relationship of the motor loads.

A further object of this invention is the provision of control apparatus for at least two electric motors whereby two separate individual control functions for the motors are accomplished by a single rotating regulator.

For a better understanding of the invention, reference should be had to the accompanying drawings, wherein.

Although the principles of the invention are illustrated by a four pole amplifying regulating generator, and its application to a trolley drive system and a control system for a material handling bucket, the generator may have more than four poles and may be used in conjunction with many other control systems.

Figure 1:
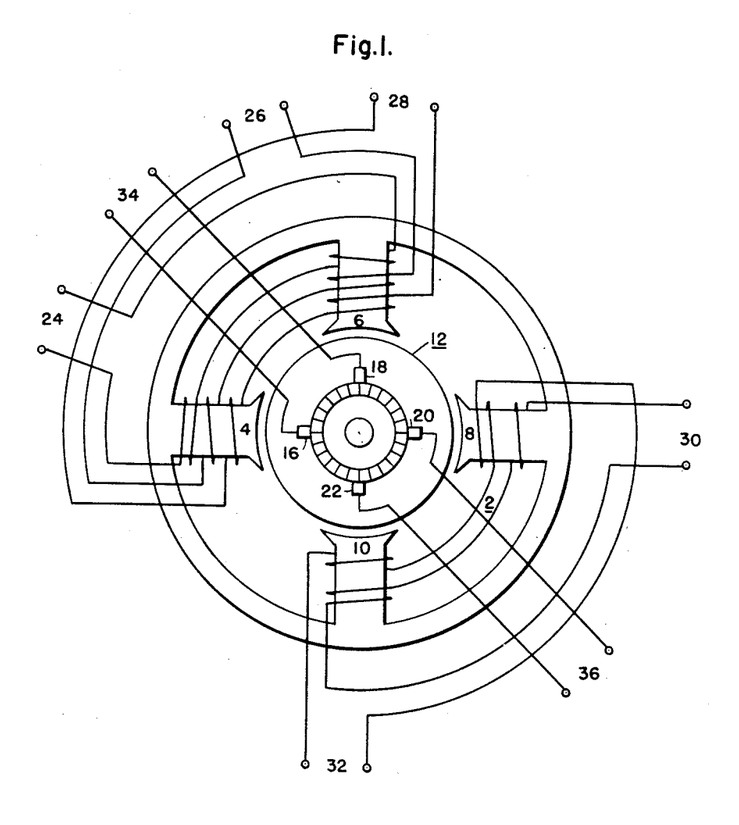
Figure 1 is a schematic view of a regulating generator.

The amplifying regulating generator is shown in Fig. 1 and includes a stator 2 with poles 4, 6, 8 and 10. A rotor 12 is provided with a commutator 14 and brushes 16, 18, 20 and 22 which are substantially along the physical axial center line of the poles 4, 6, 8 and 10, respectively. Windings are distributed upon the poles. Three sets of windings are provided upon the two poles 4 and 6, and corresponding windings on these poles are interconnected and brought out to terminals 24, 26 and 28. Two groups of windings are shown on poles 8 and 10, respectively, and corresponding windings on these poles are interconnected and brought out to terminals 30 and 32.

Terminals 24, 26 and 28 thus may be separately energized but the flux density beneath the poles 4 and 6 will be determined by the net effective excitation. Individual sources of supply may also be connected to terminals 30 and 32 for the windings on poles 8 and 10 but the flux density beneath these poles will be determined by the net effective excitation.

Leads are brought out from the brushes 16 and 18 on the commutator to terminals 34 and leads are brought out from the brushes 20 and 22 on the commutator to terminals 36. The armature is lap wound and has no cross connections. At any instant one quarter of the windings excite the brushes 16 and 18 and another one quarter of the winding the brushes 20 and 22.

The poles 4 and 6 thus supply flux to the armature conductors for brushes 16 and 18 and the poles 8 and 10 supply flux to the armature conductors for the brushes 20 and 22. Since the poles 4 and 6 receive their excitation from sources separate from the excitation sources of the poles 8 and 10, that is, since two unrelated signals are supplied to the recited pole pairs, two separate unrelated output voltages are taken from the terminals 34 and 36, respectively. The voltage taken from the terminals 34 is proportional to the resultant of the inputs, or control signals, supplied to the windings having terminals 24, 26 and 28, and the voltage taken from terminals 36 is proportional to the resultant of the inputs, or control signals, supplied to the windings having terminals 30 and 32.

Tests on actual machines such as the one just described show that interference between the signals can be kept quite low, average values of interference being slightly less than 1%. Thus, it is clear that a four pole machine having a lap-wound armature may be used to accomplish the function of more than one machine.

The showing in Fig. 1 is schematic to aid in an understanding of the invention, however, the principles this showing illustrates may be practiced by using more than four poles. For example, if an eight pole machine were used, the windings on adjacent pole pairs could be grouped in such a way as to receive the independent signals, and thus if a lap-wound armature were used, the brushes under the respective pole pairs could pick off four independent voltages which would be substantially proportional to the control signals supplied to the windings on the pole pairs of the respective pairs of brushes. It is also to be understood that in the case of the eight pole machine, four adjacent poles (two adjacent pole pairs) could have their windings interconnected and supplied by one or more excitation control signals, then the brushes of like polarity under those four poles could be interconnected, and one voltage obtained from the brushes which would be proportional to the resultant excitation of those four adjacent poles. If the four remaining poles and brushes thereunder are connected as described above, and excited from a separate excitation control source, then the eight pole machine may be used to supply two separate and independent voltages, each voltage being proportional to the excitation of one set of poles. To simplify the showing the interpoles normally being used have not been shown.

Figure 2:
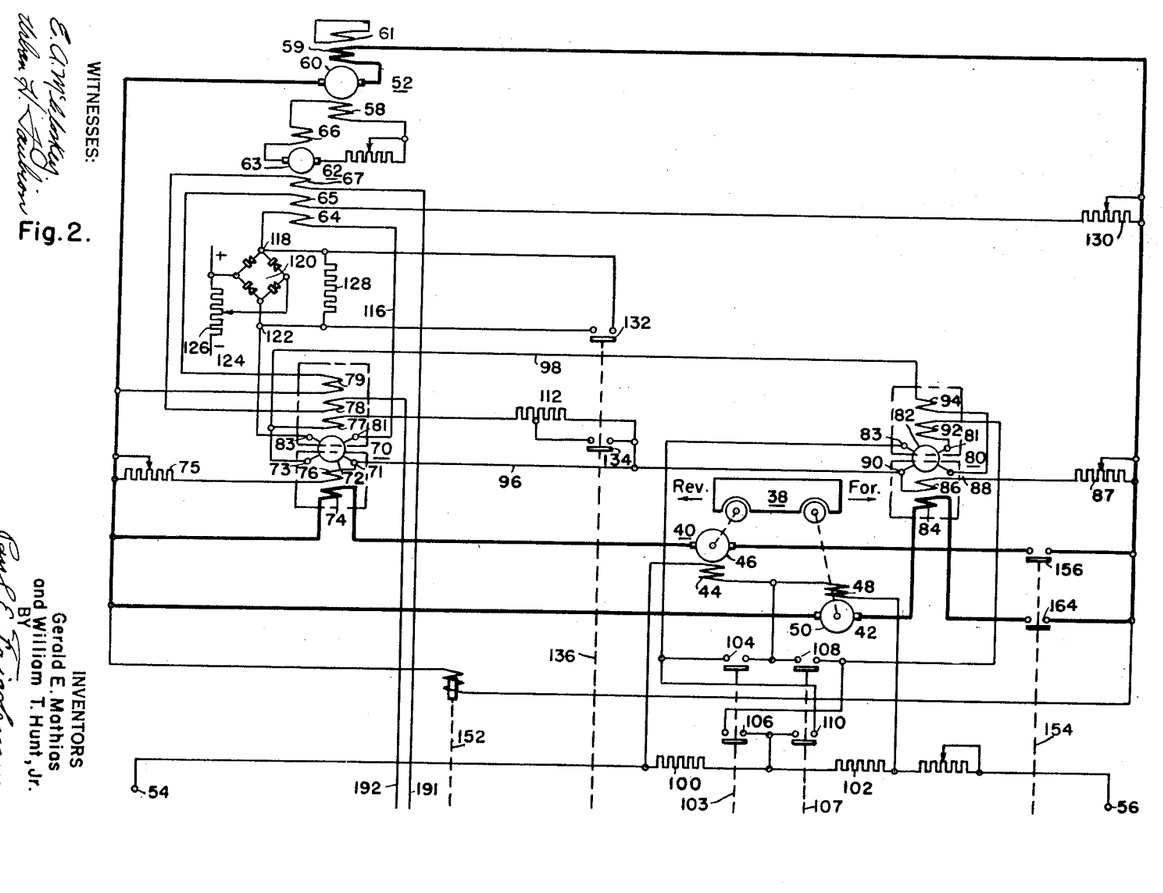
Figs. 2 and 2A combined diagrammatically illustrate a trolley drive system utilizing the regulating generator of Fig. 1.
Figure 2A:
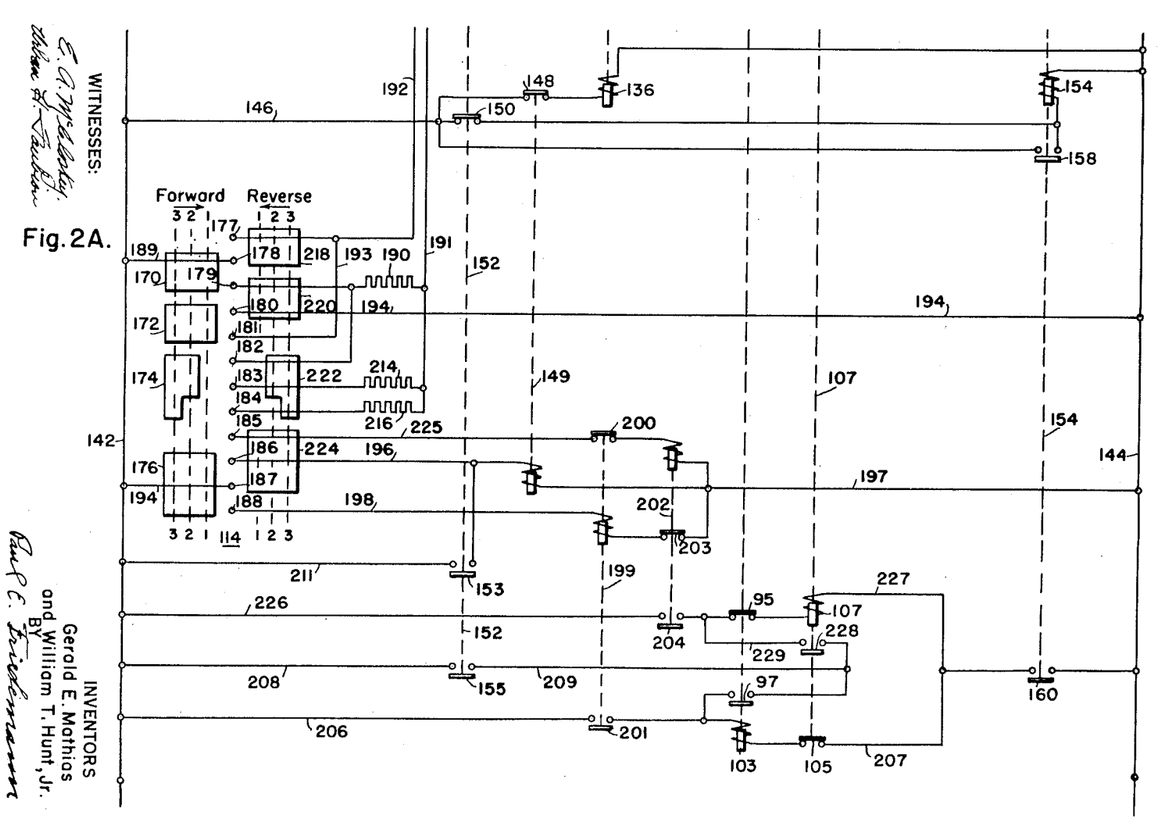

Figs. 2 and 2A combined are illustrative of an application of the four pole regulating generator in a novel control system for a trolley drive. The rotating generators are utilized to perform a current limit function, a counter E. M. F. regulating function, and the function of balancing the loads between two drive motors for a trolley. Referring to Figs. 2 and 2A, the trolley 38 is to be driven either in the forward or reverse directions by a drive motor 40 coupled to one set of wheels and drive motor 42 coupled to the other set of wheels. The armatures 46 and 50 of drive motors 40 and 42, respectively, are connected in parallel and supplied by a generator 52 in a variable voltage drive system.

The field windings 44 and 48 of the motors 40 and 42, respectively, are, under normal conditions, supplied from a constant potential direct current source from terminals 54 and 56.

The generator 52 has field windings 58, 59 and 61 and armature 60. Since the generator is driven at a constant speed, its output and therefore the voltage on the armatures 46 and 50 of drive motors 40 and 42 are determined by the excitation of the generator field winding 58. The excitation of the field winding 58 of generator 52 is determined by the output of the several amplifying means, the amplifying means illustrated comprising the rotating regulators 62, 70 and 80. The rotating regulators 70 and 80 are of the type illustrated in Fig. 1 and described previously. The rotating regulator 80 has an armature 82 and a field winding 84 which field winding 84 is connected in series with the armature 60 of motor 42 and therefore receives a signal which is proportional to the current in the armature 50 of motor 42. The rotating regulator 80 also has a differential field 86 which is in opposition to the main current field 84. The differential field 86 and the main current field 84 are distributed on one pair of adjacent poles to give a separate independent output at terminals 88 and 90. The remaining pair of adjacent poles on generator 80 have a self-energizing field winding 92 and a load balance field winding 94.

The rotating regulator 70 has an armature 72, a current field 74 which is in series with the armature 46 of drive motor 40, and therefore has an excitation which is proportional to the armature current of motor 40. Arranged on the same pair of adjacent poles as current field winding 74 is a differential field winding 76, so that the output of terminals 71 and 73 of the rotating regulator 70 is proportional to the resultant excitation of the two field windings 74 and 76. On the opposite pair of adjacent poles of rotating regulator 70 there is a pattern field winding 78, a voltage field winding 79, and a current field winding 77. Therefore, the output of the terminals 81 and 83 of rotating regulator 70 is proportional to the net excitation of field windings 77, 78 and 79.

Rotating regulator 62 has an armature 63, a current limit field winding 64, a voltage field winding 65, a pattern field winding 67, and a self-energizing field winding 66. The field windings on rotating regulator 62 are distributed on all of the poles so that one output is obtained. The rotating regulators 62, 70 and 80 are adjusted to operate substantially along the air gap lines, the purpose of this being to obtain the necessary regulation and amplification.

The differential fields 76 and 86 are provided with rheostats 75 and 87, respectively, for adjusting the outputs at terminals 71 and 73 and terminals 88 and 90 for equal armature currents or load distribution between motors 40 and 42.

The lower output terminals of rotating regulator 70 and rotating regulator 80 are connected in opposition to each other, and any difference in the loads between the two motors 40 and 42 will cause a current, proportional to such load difference, to flow around the loop circuit including the terminal 71, armature 72, terminal 73, lead 98, field winding 94, terminal 88, armature 82, terminal 90, and lead 96. The field winding 94 thus carries a current which is proportional to the load unbalance of motors 40 and 42. The only other field winding on the same pair of poles with the field winding 94 is the self-energizing field winding 92. Therefore, the output of the upper output terminals of rotating regulator 80 is a function of the load unbalance of motors 40 and 42.

This output may be reversibly connected to opposite corners of a "bridge" circuit including the resistors 100 and 102 in two adjacent legs, and the field windings 44 and 48 in the other two adjacent legs. The field windings 44 and 48 obtain their normal excitation from terminals 54 and 56, however, the output of rotating regulator 80 at terminals 81 and 83 is so connected to circulate an additional current in the bridge circuit independent of the basic field excitation, strengthening the shunt field excitation of the motor with the higher load and proportionally decreasing the shunt field excitation of the motor with the smaller load.

It will be noted that contacts 104 and 106 and contacts 108 and 110 of contactors 103 and 107, respectively, are in the circuit in such a way as to be able to reverse the output of the rotating regulator 80 between terminals 81 and 83 with respect to the bridge circuit. The sequence of operation of the contactors and the reasons for having the contactors and contacts in the circuit is explained hereinafter.

The voltage winding 79 of rotating regulator 70 is connected in series with field winding 65 of rotating regulator 62 and the rheostat 130 across the output of the main generator 52 whereby the rotating regulator 62 will have a selected voltage signal impressed upon its field winding 65 and the same voltage signal impressed on field winding 79 disposed upon one pole pair. Field winding 77 of rotating regulator 70 is connected in series with resistor 112 across the output of the rotating regulator 70 at terminals 71 and 73 so that a signal is applied to the pair of poles over the brushes which supply terminals 81 and 83 which is proportional to the current in the armature 46 of motor 40. In addition, that same pair of poles has a pattern field winding 78 which is connected in series with the pattern field winding 67 of rotating regulator 62 across a voltage source controlled by a drum controller 114. Therefore, the output of rotating regulator 70 at terminals 81 and 83 is dependent upon the net effective excitation of the pattern field 78 and current field 77 opposed by the voltage field 79.

The terminals 81 and 83 are connected through lead 116, current limit field winding 64 to one terminal 118 of rectifiers 120 connected in full bridge arrangement opposite terminal 122 of the rectifier arrangement, lead 124, and terminal 83. The rectifier is supplied from the biasing potentiometer 126 and the biasing voltage which is tapped off the potentiometer 126 is applied to one pair of diagonals of the rectifiers 120 in full bridge arrangement. Across the opposite pair of terminals 118 and 122 is connected a resistor 128 which is supplied by the output of rotating regulator 70 at terminals 81 and 83. No current will flow in the circuit which contains armature 72, terminal 81, lead 116, field winding 64 of rotating regulator 62, the rectifiers 120, lead 124 and terminal 83 until the bias voltage tapped off of potentiometer 126, applied to the diagonals of the rectifiers 120 in full bridge arrangement, is exceeded. The unbalance between the pattern field 78, and the voltage field 79 is used to determine the magnitude of output voltage required for current limit when the motor load current reaches the limit current. This insures that the limit current will be the same regardless of speed or operating conditions, such as regeneration or plugging.

The pattern field 67 of rotating regulator 62 receives excitation proportional to the desired speed of the trolley drive motors. The polarity of the pattern field excitation determines the generator polarity and hence the direction of rotation of the trolley motor. The pattern field is controlled directly from the drum controller 114. The voltage field 65 receives an excitation as a measure of the trolley generator voltage. The voltage field is in opposition to the pattern field during normal operation, and thus performs a counter-electromotive force regulation function. A potentiometer 130 is supplied in series with the voltage field 65 in order to regulate its excitation. The current limit field 64 is also in opposition to the pattern field and is excited only when the load exceeds a predetermined value and restricts the output of regulating generator 62 so that the trolley motor load does not exceed the predetermined limit value.

It will be noted that contacts 132 and 134 are provided on contactor 136 in order to recalibrate the current limit circuit, the operation of the contactor 136, and the reason for the recalibration will be explained later.

Self-energizing field 66 supplies the steady-state excitation required to maintain the existing output voltage. This is important in the present case, since the rotating regulators are operated substantially along the straight portion of the no-load saturation curve.

While the functions of the main operating components of the system have been described, a still better understanding of our invention may be obtained from a study of the sequence of operation of the components of the system. The control potential is provided by leads or buses 142 and 144. When the leads are not energized, all of the contactors are in the positions shown.

When the leads 142 and 144 are energized, a circuit is established from these leads through lead 146, contacts 148 of contactor 149, the coil of contactor 136 to lead 144. The coil of contactor 136 picks up its armature and closes contacts 132 and 134. Contacts 132 now short-circuit resistor 128 and contacts 134 now short-circuit a part of resistor 112. With resistor 128 short-circuited, a path is provided from armature 72 through terminal 81, current limit field 64, terminal 118, through contact 132, terminal 122, to terminal 83. Since the resistance value, due to the closure of contacts 134, in series with current field 77 is decreased, more current will flow in that field for a given current in the armature of the motor 40 and current will be allowed to flow in field winding 64 without having to overcome the current limit bias. Since the effect of field winding 64 is in opposition to the pattern field winding 67, and the current limit value is effectively reduced to zero, when the generator 60 is running and there is no excitation provided to the pattern field winding 67 of rotating regulator 62 and pattern field winding 78 of rotating regulator 70, the current limit system is used to reduce the circulating current due to the residual generator voltage, i. e., it is used to reduce the residual generator voltage when the system is at rest.

Another circuit may be traced from the lead 142 through contact 150 on contactor 152 through the coil of contactor 154 to lead 144. Contactor 154 is then picked up, which closes contacts 156, 158, 160 and 164. The contacts 156 and 164 close the circuits from the generator 52 through armatures 46 and 50 of the motors 40 and 42. Contacts 158 lock the coil of contactor 154 in the circuit and contacts 160 are used to set up a circuit which will be explained later.

When the trolley 38 is to be moved in either the forward or the reverse direction, the controller 114 is operated. For example, if it is desired to move the trolley in the forward direction, the controller is moved to its first "forward" position whereupon a circuit is established from lead 142 to terminal 178 through controller segment 170 to terminal 179 through resistor 190, lead 191, pattern field 67 of rotating regulator 62, pattern field 78 of rotating regulator 70, leads 192 and 193, terminal 181 through controller segment 172, terminal 180, lead 194 to lead 144. Thus, a voltage is applied across the pattern fields 64 and 78 to cause the generator field 58 to have an excitation which will produce a voltage output from generator 52 to cause the motors 40 and 42 to rotate in such a manner as to move trolley 38 in a forward direction. It will be noticed that when the drum controller 114 is in any of the forward positions, segment 176 is rotated to bridge contacts 186, 187 and 188 to complete circuits from lead 142 through lead 194, terminal 187, terminal 186, lead 196, the coil of contactor 149, lead 197 to lead 144. Thus, contactor 149 is picked up, opening contacts 148 to thus deenergize contactor 136. Contacts 132 thus open to remove the short-circuit for resistor 128 and also to remove the short from a part of resistor 112 which is in the circuit with current winding 77. The current limit is thus put back in the circuit when the trolley is to be moved in either direction by the motor so that the current in the circuit of the motors and generator cannot exceed the limit value.

Segment 176 also completes a circuit from lead 142 through lead 194 to the lead 198, the coil of contactor 199, contact 203 of contactor 202, lead 197 to lead 144. When contactor 199 is energized, contacts 201 are closed thus completing a circuit from lead 142 through lead 206, contacts 201, the coil of contactor 103, contacts 105, lead 207, contacts 160 to lead 144. The contactor 103 causes contacts 97 to close, contacts 95 to open, contacts 106 and 104 to close. The closure of contacts 106 and 104 cause the circuit to be completed to the "bridge," containing resistors 100 and 102 and the field windings 44 and 48 of motors 40 and 42, from terminals 81 and 83. The output from terminals 81 and 83 thus causes the flow of an additional current in the "bridge" circuit independent of the basic field excitation from terminals 54, 56, to thus strengthen the field excitation of the motor which is carrying the greater load and proportionally decrease field excitation of the other motor, should a load unbalance occur.

As the voltage of generator 52 builds up, the coil of contactor 152 will be energized until, at some selected voltage value, it will cause the contactor 152 to pick up. This will open contacts 150 and close contacts 153 and 155. The opening of contacts 150 will at this stage of operation have no effect on contactor 154 since this contactor is held in by contacts 158. Contact 155 of contactor 152 closes to complete a circuit from lead 142, through lead 208, contacts 155, lead 209, through contacts 97, the coil of contactor 103, contacts 105, lead 207, contacts 160 (now closed) to lead 144 to cause the coil of relay 103 to be locked in the circuit. Contacts 153 of contactor 152 complete a circuit from lead 142, through lead 211, contacts 153, the coil contactor 149 through lead 197, to lead 144. This insures that the coil of contactor 149 is picked up after the generator voltage is above a predetermined minimum so that the current limit is in. Also this interlock circuit for coil of contactor 149 insures that current limit will be in as long as there is a given minimum voltage on the generator, even after the drum controller 114 is returned to the neutral position.

For the second and third positions of the drum controller in the forward direction, the circuits are exactly the same except that segment 174 will successively bridge terminals 182 and 183, and 182, 183, and 184. This puts resistor 214 in parallel with resistor 190 in the second position and resistors 214 and 216 in parallel with resistor 190 in the third position, thereby successively decreasing the effective resistance in series with the pattern fields 67 and 78 of rotating regulators 62 and 70, respectively, and thus increasing the excitation of field 58 on generator 52, which thus increases the generator output and thus the speed of the trolley for a given load.

For operation of the trolley in the reverse direction, the drum controller 114 is moved to the first position "reverse" whereupon a circuit is established from lead 142, through lead 189, segment 218, lead 192, pattern field windings 78 and 67, lead 191, resistor 190, terminal 179, terminal 180 through segment 220, to leads 194 and 144. The pattern field windings 77 and 67 of rotating regulators 70 and 62, respectively, are now energized with reverse polarity. For the second position of the reverse drum controller, resistor 214 is put in parallel with resistor 190 by the segment 222 bridging contact fingers 182 and 183, and for the third position "reverse" segment 222 also bridges contact finger 184, whereby the speed of motors 40 and 42 is increased in successive steps in the reverse direction.

When the drum controller is in any of the "reverse" positions segment 224 effects the energization of leads 196 and 225. Energization of lead 196 effects the same operations as above discussed for forward operation. Energization of lead 225 establishes a circuit from this lead through contacts 200, the coil of contactor 202 to the energized lead 197, thus picking up contactor 202 and closing contact 204. Contacts 204 complete a circuit from energized lead 226, through contacts 204 and contact 95 of contactor 103, the coil of contactor 107, lead 227, contacts 160 (now closed), to lead 144. The energization of the coil of contactor 107 causes contacts 108, 110 and 228 to close. Contacts 228 establish a holding circuit for contactor 107. The closure of contacts 110 and 108 cause the output at terminals 81 and 83 of rotating regulator 80 to be placed with reverse polarity across the "bridge" circuit, which contains resistors 100 and 102 in two legs and the field windings 44 and 48 of motors 40 and 42, respectively, this reverse polarity being the correct polarity to circulate an additional current in the "bridge" circuit independent of the basic field excitation to strengthen the field excitation of the motor with a higher load and proportionally decrease the field excitation of the other motor, should load unbalance occur between the motors. Contacts 105 are opened when the coil of contactor 107 is energized to insure that contact 103 cannot be picked up at the same time that contactor 107 is in the circuit.

Thus, it may be seen that the control system obtains very effective current limit, load balance, and counter-electromotive force regulation having only three rotating regulators where a usual system would require at least five rotating regulators to perform the same function. This represents a considerable saving in weight, space and money over other systems.

Figure 3:
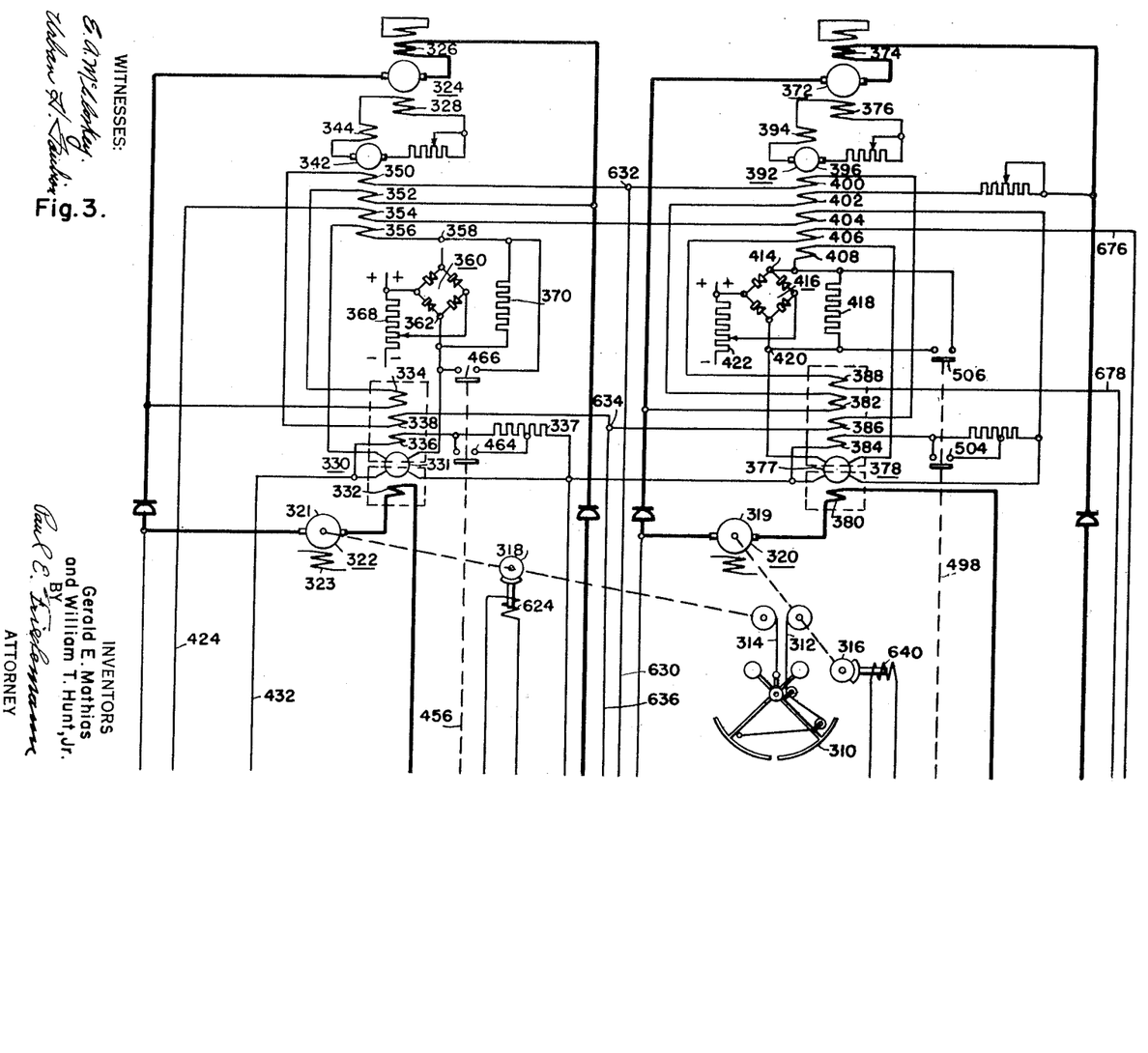
Figs. 3 and 3A combined diagrammatically illustrate a control system having a material handling bucket which also uses the regulating generator.
Figure 3A:
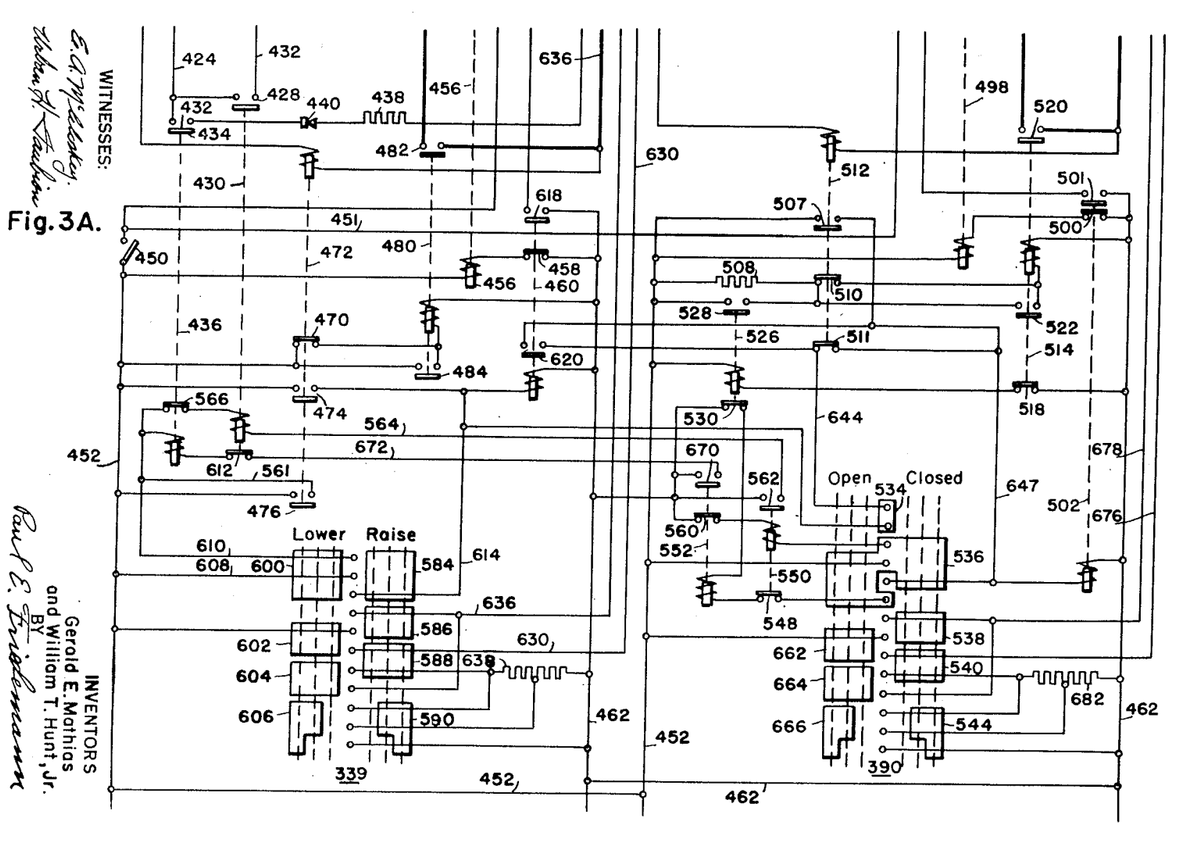

Another application of the rotating regulator illustrated in Fig. 1 is shown in the schematic diagram of the control system for a two-line material handling bucket shown in Figs. 3 and 3A. The system is described in more detail and claimed in a copending application having the same filing date as the present application, by Gerald E. Mathias entitled "Control for Two-Line Material Handling Buckets," and assigned to the assignee. The operation of the main components will be described first, and later the sequence of operation of the relays and components will be described.

Referring to Figs. 3 and 3A, the material handling bucket 310 is provided with close-line 311 for the purpose of closing the bucket and aiding in the raising and lowering of the bucket and a hold-line 314 for the purpose of raising and lowering the bucket. A pair of brakes 316 and 318 are utilized for holding the close-line and the hold-line in position when the systems are not in use. A close motor 320 and a hold motor 322 are used to drive the close-line and the hold-line for the material handling bucket.

The control system for the hold-line motor includes a main hold generator 324 which provides a variable voltage drive for the motor 322. The hold-line motor has a field winding 323 which is energized from a constant potential source. The hold generator has a self-energizing field winding 326 and a separately excited field winding 328.

The regulating generator 342 controls the excitation of the field winding 328. This rotating regulator 342 has a self-energizing field winding 344 and the field winding 328 in its single output circuit. This regulating generator has a pattern field winding 350, a voltage field winding 352, a load balance field winding 354, and a current limit winding 356.

The rotating regulator 342 is controlled in its operation by the rotating regulator 330. This rotating regulator is of the type disclosed in Fig. 1, namely having two substantially independent outputs. The excitation for the lower pair of output terminals is provided by the field winding 332 connected in series with the armature winding 321 of the hold motor 322, and the excitation for the upper pair of output terminals is provided by a voltage field winding 334, a pattern field winding 338, and a current field winding 336.

The close generator 372 has a self-energizing field winding 374 and a separately excited field winding 376 connected in series with the armature winding 396 and field winding 394 of the rotating regulator 392. The rotating regulator 392 is similar in structure and function to the rotating regulator 342, and is controlled by a rotating regulator 378 which is similar in structure and function to the rotating regulator 330. The armature current of the close-line motor 320 controls the excitation of the lower output terminals of the regulator 378, through the field winding 380 in series with the armature winding 319 of the close-line motor 320.

The current limit field winding 356 is utilized to limit the current flowing in the armature 321 of motor 322 to a predetermined value. The current limit is accomplished by connecting the output of the upper terminals of the armature 31 in series with the current limit field winding 356 and terminals 358 and 362 on rectifier bridge 360. The other terminals of the bridge rectifiers 360 are connected across a selected portion of potentiometer 368 which is supplied with the bias voltage which determines the current limit value. A resistor 370 is also connected across terminals 362 and 358. The voltage across the resistor 370 is in opposition to the voltage from the biasing source of potentiometer 368 and must exceed that voltage before any current can flow in the current limit field winding 356. Thus, there is no signal in current limit field winding 356 unless a predetermined current (determined by the biasing voltage) in the armature 321 of motor 322 is exceeded.

The current limit field winding 356 is in opposition to the pattern field winding 350. When the motor load reaches a predetermined maximum, the current limit field winding 356 is excited to prevent the load current from exceeding the maximum. The voltage field winding 352 also is in opposition to the pattern field winding 350 during normal operation. The signal input to the load balance field winding 354 is zero for most operating conditions with the bucket closed.

The close-line motor 320 has control components which are similar to those described for the hold-line motor and which operate in a similar manner.

The rotating regulator 378, like regulator 330, has a current field 380 which is energized by the current flowing through the armature of the close-line motor armature 319. The rotating regulator 378 has a current field winding 384 energized from the voltage across upper terminals of its armature 377 so that it is excited as a function of the current in the armature 319 of close-line motor 320. A pattern field winding 386 is provided and it is excited from the same control source that excites the pattern fields 338 and 350 of rotating regulators 330 and 342, respectively. The rotating regulator 378 has in addition a control field winding 388 which is responsive to a control source which is controlled by close-line drum controller 390.

Rotating regulator 392 which corresponds to rotating regulator 342 in the hold-line control circuit is provided in the close-line control circuit to directly control the excitation of separately excited field winding 376 of the close-line generator 372.

A biasing source is applied across potentiometer 422 in the same manner as the biasing source is applied across potentiometer 368 in the hold-line generator control circuit. Similarly a current limit circuit is provided by the cooperating rectifier 416. The current limit field winding 408 is in opposition to the pattern and control field windings 400 and 406. When the load of motor 320 reaches a predetermined maximum, this field is excited to prevent the load current from exceeding the maximum.

It will be noticed that load balance field winding 354 of rotating regulator 342 and load balance field winding 404 of rotating regulator 392 are connected in series with each other and that the outputs of the armature 377 of rotating regulator 378 at the lower terminals is connected to the output of armature 331 of rotating regulator 330 at the lower terminals. The outputs of the rotating regulator 330 and rotating regulator 378 which are connected together as just described are connected in opposition and connected across the load balance field windings 354 and 404. That is, a circuit is formed which includes armature 377 of rotating regulator 378, load balance field winding 404 of rotating regulator 392, load balance field winding 354 of rotating regulator 342, lead 424, contact 428, when contactor 430 is energized, through lead 432, the armature 331 of rotating regulator 330 back to the armature 377. Since the outputs in this circuit of rotating regulators 330 and 378 are in opposition, there will be no current flowing around this circuit when the loads of motors 322 and 320 are equal, and hence there will be no signal input to the load balance field windings 354 and 404 when the loads of the motors are balanced. Any difference in load, however, between the hold-line motor 322 and the close-line motor 320 is detected by the rotating regulators 330 and 378, which in turn will cause a current to circulate through the load balance field windings 354 and 404. The polarity of the signal is such that the drive with the larger load has its generator voltage reduced while the opposite drive receives an increase in excitation. This is true for positive loads. For overhauling loads, the polarity is reversed so that load balance may still be maintained, raising the excitation on the generator with the larger load.

Since handling an empty bucket is very critical, in that if as little as 4% of the total weight being supported is being held by the close-line 312, it is sufficient to close the bucket 310. Therefore, it is necessary when handling an empty bucket or for operation with the bucket open, that the system regulate for load unbalance rather than load balance. This condition obtains when contacts 434 are closed by contactor 436 and the contacts 428 are open.

The load unbalance circuit consists of the output of armature 377 of rotating regulator 378 which appears between the lower terminals, a limiting resistor 438, a rectifier 440, and the load balance field winding 354 of rotating regulator 342, and load balance field winding 404 of rotating regulator 392. It will be seen that for the conditions just described, the part of the output of rotating regulator 330 for the hold-line control system which appears between the lower terminals of the armature 331, is removed from the circuit thus changing the system to one that tends to regulate for load unbalance, shifting the major portion of the load to the hold-line drive motor 322.

The desideratum is to be able to raise and lower the bucket while the bucket remains either open or closed, and to be able to open and close the bucket without raising or lowering, and if the bucket is raised or lowered when full, it is desirable to have the hold-line 314 and close-line 312 share the load equally. This result has been achieved very effectively in the present control system. The control system also provides that if the bucket was last in the open position, the bucket will remain open as it is raised or lowered, and if the bucket was last in the closed position, it will remain closed while being raised or lowered unless, of course, both controls are operated.

The operation is as follows: If leads 452 and 462 are energized and the main generators 324 and 372 are running at the required speed, and starting switch 450 is still in the open position, a circuit will be completed from energized lead 452, through the coil on contactor 456, through contacts 458 on contactor 460 to negative lead 462. Contactor 456 will then pick up, closing contacts 464 and 466. Contacts 464 remove part of the resistance of resistor 337 from the circuit which contains current field winding 336 making the current field more sensitive, and contacts 466 remove the biasing potential from the circuit containing current limit field winding 356, which effectively eliminates the current limit value or limits the current in the hold-line motor 322 to zero (i. e. reduces the current flow due to a generator residual of generator 324). Another circuit may be traced from lead 452 through contacts 470 on contactor 472, through the coil on contactor 480, to lead 462. Thus contactor 480 picks up to close its hold-in contacts 484, and to close contacts 482, which completes the circuit from the main hold-line generator 324 through the armature 321 of the hold-line motor 322.

Circuits are set up for the close-line control system in the following manner. When leads 452 and 462 are energized, a circuit is established from lead 452 through the coil of contactor 526, contacts 518 on contactor 514 to lead 462. Contactor 526 is a fast acting contactor and thus picks up ahead of other contactors that are energized when the leads 452 and 462 are energized. The operation of contactor 526 opens the contacts 530 to prevent energization of the coil of the empty bucket relay 552. The loaded bucket relay 550 is thus energized.

The circuit for the loaded bucket relay may be traced from lead 452 through segment 536 of close-line drum controller 390, the coil of the loaded bucket relay 550, contacts 560 on the empty bucket relay 552 to lead 462. This relay thus opens contacts 548 and closes contacts 562.

The operation of contactor 526 also closes the contacts 528. This operation shorts out the resistor 508 and thus effects a forcing action on contactor 514. The circuit for contactor 514 may thus be traced from lead 452 through the contacts 528, contacts 510 on the voltage relay, or contactor 512, the coil of contactor 514 to lead 462. Contactor 514 thus picks up to close contacts 522, the hold in contacts, and to close contacts 520 to connect the close-line motor armature 319 in the circuit with the close-line generator 372.

The contactor 514 also opens contacts 518 thus deenergizing the contactor 526 to open the contacts 528 and close contacts 530. The opening of contacts 530 thus inserts the resistor 508 back in the circuit for contactor 514 but this contactor remains picked up on the lower current value in its coil circuit. The closure of contacts 530 does not effect the energization of contactor 552 because contacts 548 are now open.

Another circuit is established from lead 452 through the coil of contactor 498 and contacts 500 to lead 462. Contactor 498 is thus picked up closing the contacts 504 and 506 to effectively reduce the current limit to zero and increase the sensitivity of the current field winding 384.

The system is now set up for load balance with the fields 328 and 376 of hold-line generator 324 and close-line generator 372, respectively, deenergized.

Assume the bucket is up and closed and it is desired to lower the material handling bucket 310, the switch 450 is then closed and the master drum controller 339 is moved to the first position lower. In the first position lower, segment 600 effects the energization of leads 610 and 614 from leads 452 and 608. The energization of lead 610 establishes a circuit from lead 610 through contacts 566, the coil on load balance contactor 430, lead 564 through contacts 562 to lead 462, thus closing the contacts 428 to complete the load balance circuit. This load balance circuit may be traced from a lower terminal on the armature 331 on the rotating regulator 330 through lead 432, contacts 428, lead 424, load balance field winding 354 on the regulator 342, load balance field winding 404 on the regulator 392, the lower terminals on the armature 377 of the rotating regulator 378 to the other lower terminal on the armature 331 of the regulator 330. When contactor 430 is picked up, it also opens contact 612, which insures that the coil on contactor 436 cannot be energized.

The energization of lead 614 establishes a circuit from this lead 614, through the coil on contactor 460 to lead 462. Contactor 460 is then picked up, closing contacts 618 and 620 and opening contact 458. When contacts 458 are opened, the circuit which energizes the coil of contactor 456 is opened, thus opening contacts 464 and 466, which puts the current limit control back into operation in the hold-line motor control system.

Closing contact 618 completes the circuit through coil 624 of the brake 318 for the hold-line motor 322. This releases the brake of the hold-line system to allow the hold-line motor to rotate when energized.

Segment 602 energizes lead 630 to establish a circuit from this lead 630, to a junction 632 between pattern field winding 350 of rotating regulator 342 and pattern field 400 of rotating regulator 392. The pattern field winding 350 of rotating regulator 342 is in series with the pattern field winding 338 of rotating regulator 330 and the circuit goes from there to a junction 634 between pattern field 338 and pattern field winding 386 of rotating regulator 378 which is in series with pattern field winding 400 of rotating regulator 392. A lead 636 goes from the junction point 634 through a segment 604, all of the sections of resistor 638 to lead 462. Thus, a control source is supplied to the pattern field windings of the rotating regulators.

When the pattern field windings are energized, a voltage is supplied to the field windings 328 and 376 of the hold-line generator 324 and the close-line generator 372, respectively, so a voltage begins to build up which will cause the motors to rotate in the direction selected by the drum controller and since the load balance circuit is in, the bucket would be lowered with the hold-line 314 and the close-line 312 sharing an equal part of the load. To accomplish this, brake 316 must be released. The circuit for the coil 640 of brake 316 may be traced from lead 452, through lead 608, segment 600, lead 614, segment 534 of controller 390, lead 644, through contacts 511 on contactor 512, lead 647, the coil on contactor 502 to lead 462. Contacts 501 are thus closed to establish a circuit for coil 640, which circuit may be traced from lead 452 through switch 450, lead 451, coil 640 and contacts 501 to lead 462. When relay 502 is picked up, contacts 500 are opened to thus break the circuit of the coil of contactor 498 and allows contacts 504 and 506 to drop out and thus set up current limit in the close-line motor control system, as was done by contactor 456 and its contacts 464 and 466 for the hold-line motor control system.

As the voltage of the hold-line generator 324 builds up, it energizes the coil of contactor 472 which is connected directly across the generator. At a selected voltage value this contactor operates to open contacts 470 and to close contacts 474 and contacts 476. Opening of contact 470 has at this time no effect, since the coil of contactor 480 is locked in the circuit. The closing of contacts 474 completes a circuit from lead 452 through the coil of contactor 460 to lead 462. This simply serves to hold the contactor 460 in the circuit, independent of segment 600, as the coil of contactor 460 was already energized as has been explained previously. The closing of contacts 476 simply serves to complete a circuit through the coil of the load balance contactor 430, which has already been energized as explained previously, thus providing a holding circuit independent of segment 600, for that coil. It will be noticed that it would also provide a holding circuit for the coil of empty bucket contactor 436 if it is picked up instead of contactor 430.

Since the pattern field windings 338 and 350 in the hold-line motor control system are now energized with the polarity described, and the pattern field windings 386 and 400 in the control system for the close-line motor 320 are also energized, the motors 322 and 320 will rotate in a direction to reel out the cables 314 and 312 and lower the bucket 310, and since the system is set up for load balance, as has been previously described, the hold-line cable 314 and the close-line cable 312 will carry substantially equal shares of the load and thus the motors will carry equal loads.

In the first position lower for master drum controller 339, the pattern field windings are energized through a circuit which contains a resistor 638 in series with the fields. This provides the slowest speed of lowering. In the second position lower segment 606 shunts out part of the resistor 638, thus putting a greater portion of the input voltage across the pattern field windings, which produces an increased speed. In the third position lower, the speed is further increased since segment 606 shunts out the entire resistor 638.

The bucket is raised in a manner similar to that just described for lowering, except the master drum controller 339 is rotated in the opposite direction and segments 584, 586, 588, 590 are rotated into the terminals rather than segments 600, 602, 604, 606. Segment 584 completes exactly the same circuits as segment 600 completes for the lower position. In the first position raise, segments 586, 588 again put the pattern field windings 338 and 350 of the control system of the hold-line motor 332 and pattern field windings 386 and 400 of the control system for the close-line motor 320 in series with resistor 638 across leads 452 and 462. Segments 586 and 588, however, connect the pattern field windings to the source with reverse polarity. In the second and third raised positions of drum controller 339, the series resistor 638 is removed from the circuit in steps similar to that described for the lower position to thus increase the speed of raising.

Assume that we are preparing to lower the material handling bucket 310 onto the ore heap, and that it is closed. To open the bucket, the master close-line drum controller 390 is rotated in the open direction as indicated in Fig. 3A to the first position open. With the drum controller 390 in the first position open, the circuit at segment 534 is open, but this does not effect anything at this stage of operation. When the voltage of close-line generator 372 began to rise, the coil of contactor 512 was energized, which opened contacts 510 and 511 and closed contacts 507. The closure of contacts 507 completed a cicuit from lead 452 through contacts 507, lead 647, coil of contactor 502, to lead 462. Contactor 502 thus remained energized through segment 536. When the controller 390 is moved to the first open position, the coil of contactor 502 remains energized. Rotation of segment 536 to the first position open deenergizes the coil of load balance relay 550, causing its contacts 548 to close and its contacts 562 to open. The opening of contacts 562 breaks the circuit of the coil of contactor 430. At the same time, the segment 536 establishes a circuit from lead 452 through segment 536, contacts 548, the coil of contactor 552, contacts 530 of contactor 526, to lead 462. Thus contactor 552 is picked up, opening contacts 560, which insures that a circuit will not be made through the coil of the load balance relay 550. The closing of contacts 570 completes a circuit from lead 452 through contacts 476, lead 561, the coil of the empty bucket contactor 436, contact 612 of load balance contactor 430, lead 672, contacts 670, to lead 462. When the coil of contactor 436 is energized, contacts 566 are opened and the coil of the load balance contactor 430 can not be energized. Contacts 428 are closed which sets up the control system for lead unbalance so that the hold-line motor will bear most of the load.

The segments 662 and 664 establish a circuit which includes lead 676, control field 406, control field 388, lead 678, segment 664, resistor 682 to lead 462. Succeeding positions of the drum controller will cause segment 666 to short out portions of the resistor 682 which is in series with the control field windings just recited to increase the excitation of said field windings and thus increase the speed of opening the bucket.

It will be noticed that when the drum controller is returned to the neutral position, the empty bucket and load balance relays 552 and 550 respectively and thus the empty bucket and load balance contactor 436 and 430 respectively are still energized in the manner just described so that the bucket will remain open and the system will remain set up for load unbalance. If it is desired to have the bucket closed, the drum controller 390 is simply rotated in the direction indicated in Fig. 3A. This opens the circuit containing empty bucket relay 552 at segment 536, while a circuit is still maintained through the segment 536 for the coil of load balance relay 550. Thus, the contactors 550, 552, 430 and 436 are in the position described for lowering the bucket and sets up the circuit for load balance so that the hold-line motor 322 and the close-line motor 320 will again share equal loads.

The closed segments 538 and 540 in all positions will complete the circuits to energize the control fields 388 and 406 in series with resistor 682 as did the segments 662 and 664 except that the energization voltage will be of a polarity which is opposite to the energization for opening the bucket. Segment 544 shorts out portions of resistor 682 in succession so that the pattern fields will receive increased energization with succeeding drum controller positions and the speed of the motor will be increased.

When the close-line drum controller 390 is in closed position, or in open position, the coil of contactor 502 is energized from lead 452, through segment 536 to the coil of contactor 502 and lead 462. When the hold-line drum controller is in either the "raise" or "lower" position, the coil of contactor 460 is energized from lead 452, lead 608, segment 584 or 600 of the drum controller 337, lead 614, the coil of relay 460 to lead 462. These circuits insure that the mechanical brake for both the hold-line motor and the close-line motor is released at any time the controls are set to operate the hold-line motor 322.

If the close-line drum controller is in a "run" position and the hold-line drum controller is an an "off" position, the coil 624 of mechanical brake 318 for the hold-line motor 322 will not be energized and the material handling bucket 310 will simply be opened or closed. When the bucket 310 is closed, the system is set up for load balance so the close-line motor 322 may be used to raise the the bucket by holding the close-line drum controller in "close" position when the bucket 310 is closed. In such case, the load-balance feature would cause the hold-line generator to build up a voltage and energize the coil of contactor 472 which closes a circuit from lead 452, through contacts 474 of contactor 472, the coil of contactor 460 to lead 462. Energization of the coil of relay 460 closes contact 618 which completes the circuit of the hold-line brake coil 624 to release the hold-line brake 318.

The circuit of coil 640 of the close-line brake 316 will be completed by contact 501 of contactor 502 at any time that the hold-line controller is in an "on" position to keep the close-line 312 at the right tension through circuits previously described.

Thus, it is also seen that the control system for the material handling bucket just described, and illustrated in Figs. 3 and 3A provides counterelectromotive force regulation, current limit, and load balance utilizing the rotating regulator illustrated in Fig. 1 described herein, and that such control system uses less equipment than would be required for previous systems for accomplishing the same results with a consequent saving of space, weight and expense, one or all three of which factors are often extremely important in control systems of the kind described.

While in accordance with the patent statutes, the best known embodiments of the invention have been illustrated and described in detail, it is to be particularly understood that other embodiments and applications are within the contemplation of the invention.

We claim as our invention:

1. An electric drive system comprising, a first electric drive motor, and a second electric drive motor, a main generator for said drive motors and circuit means connecting the generator to the motors, excitation means for the main generator, a control source for the control system, a first amplifying means associated with said first drive motor and said control source, a second amplifying means associated with said second drive motor and said first amplifying means, said first and second amplifying means each comprising a rotatable armature, four lap-wound circuits on said armature, a stator, four pole portions on said stator windings disposed on each pole portion, a commutator for said armature, brushes mechanically disposed substantially under each pole face on said commutator, winding means distributed on one pair of adjacent poles, other winding means distributed on the remaining pair of poles, said winding means and said other winding means being so disposed that they may be energized by separate individual control voltages and two separate outputs may be obtained from the pairs of brushes under the respective pole pairs, the outputs being a function of the control voltages of the windings on the respective pole pairs, and a third amplifying means supplying said excitation means, and coupled with an output of said first amplifying means and the control source such that its output is a function of a motor condition above a given value and the magnitude of the control source, motor excitation means coupled with an output of said second amplifying means in such a manner that its energization is controlled in accordance with the relative loads on the motors.

2. An electric drive system comprising, a first electric drive motor and a second electric drive motor, a main generator for said drive motors and circuit means connecting the generator to the motors, excitation means for the main generator, a control source for the control system, a first amplifying means associated with said first drive motor and said control source, a second amplifying means associated with said second drive motor and said first amplifying means, said first and second amplifying means each comprising a rotatable armature, four lap-wound circuits on said armature, a stator, four pole portions on said stator, windings disposed on each pole portion, a commutator for said armature, brushes mechanically disposed substantially under each pole face on said commutator, winding means distributed on one pair of adjacent poles, other winding means distributed on the remaining pair of poles, said winding means and said other winding means being so disposed that they may be energized by separate individual control voltages and two separate outputs may be obtained from the pairs of brushes under the respective pole pairs, the outputs being a function of the control voltages of the windings on the respective pole pairs, and a third amplifying means supplying said excitation means, and coupled with an output of said first amplifying means and the control source such that its output is a function of a motor condition above a given value and the magnitude of the control source, individual motor excitation means for each motor coupled with an output of said second amplifying means in such a manner that its energization is controlled in accordance with the relative loads on the motors.

3. An electric drive system comprising, a first electric drive motor and a second electric drive motor, a main generator for said drive motors and circuit means connecting the generator to the motors, excitation means for the main generator, a control source for the control system, a first amplifying means associated with said first drive motor and said control source, a second amplifying means associated with said second drive motor and said first amplifying means, said first and said second amplifying means each being a rotary type amplifier and comprising, a field structure having a plurality of pairs of poles, an armature having a commutator provided with a plurality of pairs of brushes, field windings disposed on said poles, individual field winding sets being inductively associated with a fractional number of adjacent pole pairs for controlling the voltage taken off said armature by a corresponding fractional number of adjacent brush pairs, and a third amplifying means supplying said excitation means, and coupled with an output of said first amplifying means and the control source such that its output is a function of a motor condition above a given value and the magnitude of the control source, motor excitation means coupled with an output of said second amplifying means in such a manner that its energization is controlled in accordance with the relative loads of the motors.

4. An electric drive system comprising, a first electric drive motor and a second electric drive motor, a main generator for said drive motors and circuit means connecting the generator to the motors, excitation means for the main generator, a control source for the control system, a first amplifying means associated with said first drive motor and said control source, a second amplifying means associated with said second drive motor and said first amplifying means, said first and said second amplifying means each being a rotary type amplifier and comprising a magnetic field structure having two oppositely arranged north poles and two oppositely arranged south poles, an armature having a commutator with four brushes arranged relative to said poles to assume sequentially different electric polarities, means for controlling the excitation of one pair of adjacent poles and thereby control the flux thereunder and other means to control the excitation of the other pair of adjacent poles and thereby control the flux distribution thereunder, an electrical connection from each brush under said one pair of adjacent poles to give an output which is substantially proportional to the energization of the means for controlling the excitation of the one pair of poles, an electrical connection from each brush under said other pair of adjacent poles to give an output which is substantially proportional to the energization of the said other means to control the excitation of the other pair of adjacent poles, and a third amplifying means supplying said excitation means, and coupled with an output of said first amplifying means and the control source such that the output is a function of a motor condition above a given value and the magnitude of the control source, motor excitation means coupled with an output of said second amplifying means in such a manner that its energization is controlled in accordance with the relative loads of the motors.

5. An electric drive system comprising, a first electric drive motor, and a second electric drive motor, a main generator for said drive motors and circuit means connecting the generator to the motors, excitation means for the main generator, a control source for the control system, a first amplifying means associated with said first drive motor and said control source, a second amplifying means associated with said second drive motor and said first amplifying means, said first and said second amplifying means being of the rotary type and comprising a field structure having an even number of pairs of poles, a corresponding plurality of field windings disposed on said poles respectively, an armature having a commutator provided with a corresponding plurality of brushes disposed relative to said poles respectively for assuming correspondingly different electric polarities, individual groups of field windings distributed on individual groups of adjacent pairs of poles connected to be energized from individual control sources, the brushes of like polarity under each group of pairs of poles which has groups of field windings connected to individual control sources having a common connection to give as many independent outputs as there are groups of pole pairs with individual control sources on the windings disposed thereon and said independent outputs will be determined by the individual control sources connected to the groups of field windings on the pairs of poles over the brushes, and a third amplifying means supplying said excitation means, and coupled with an output of said first amplifying means and the control source such that the output is a function of a motor condition above a given value and the magnitude of the control source, motor excitation means coupled with an output of said second amplifying means in such a manner that its energization is controlled in accordance with the relative loads of the motors.

6. An electric drive system comprising, a first electric drive motor, and a second electric drive motor, a main generator for said drive motors and circuit means connecting the generator to the motors, excitation means for the main generator, a control source for the control system, a first amplifying means associated with said first drive motor and said control source, a second amplifying means associated with said second drive motor and said first amplifying means, and a third amplifying means supplying said excitation means and coupled with said first amplifying means and the control source, a first output control means for said first amplifying means and a first excitation control means for said third amplifying means, said first output control means and said first excitation control means being responsive to a first condition of both motors, a second output control means for said first amplifying means and a second excitation control means for said third amplifying means, said second output control means and said second excitation control means in circuit relationship with said control source, a third output control means for said first amplifying means connected to have an excitation which is a function of a second condition of the first motor, a third excitation control means for said third amplifying means which is excited as a function of a third condition of the first motor in excess of a predetermined value, a first energization control means for said second amplifying means which is responsive to the difference between the first part of the outputs of the first and the second amplifying means which is dependent on the loads of the first and second motors respectively, motor excitation means coupled with the second output of said second amplifying means which is a function of said second energization control means to determine the relationship of the loads of the first and second drive motors.

7. An electric drive system comprising, a first electric drive motor and a second electric drive motor, a main generator for said drive motors and circuit means connecting the generator to the motors, excitation means for the main generator, a control source for the control system, a first amplifying means associated with said first drive motor and said control source, a second amplifying means associated with said second drive motor and said first amplifying means, said first and second amplifying means each comprising a rotatable armature, a stator, four pole portions on said stator, windings disposed on each pole portion, a commutator for said armature, brushes mechanically disposed substantially under each pole face on said commutator, first, second and third output winding means for said first amplifying means on one pair of poles, fourth output winding means for the first amplifying means on the remaining pair of poles, a first and second energization winding means for said second amplifying means on one pair of poles, third energization winding means for the second amplifying means wound on the remaining pole pair, said winding means being disposed on separate pole pairs and energized by individual control quantity so that two separate outputs may be obtained from each pair of brushes under the respective pole pairs, the outputs being a function of the control quantities of the windings on the respective pole pairs, a third amplifying means, a first excitation control means for said third amplifying means, said first output control means and said first excitation control means being responsive to a first condition of both motors, a second excitation control means for said third amplifying means, said second output control means and said second excitation control means in circuit relationship with said control source, said third output control means connected to have a control voltage which is a function of a second condition of the first motor, a third excitation control means for said third amplifying means which has a control quantity which is a function of a third condition of the first motor in excess of a predetermined value, said fourth output control means being responsive to a fourth condition of the first drive motor to give a first output which is a function of said fourth condition, said first energization winding means responsive to a second condition of said second drive motor, a second energization control means which is connected to be responsive to the difference between the first outputs of the first and the second amplifying means to give a second output of the second amplifying means which is dependent on the loads of the first and second drive motors respectively, motor excitation means coupled with the second output of said second amplifying means to determine the relationship of the loads of the first and second drive motors.

8. A load balance control system for a pair of mechanically connected motors comprising, a pair of mechanically connected motors each having an armature winding and a field winding, circuit means connecting the armature windings of said motors in parallel across the armature winding of said main generator, a pair of regulating generators each having first and second output circuits and field winding means for each output circuit, circuit means connecting the respective field winding means for said first output circuits to be energized in dependence of load current of said respective motors, circuit means differentially connecting said first output circuits in a series loop with the field winding means for the second output circuit of one of said pair of regulating generators, circuit means connecting said second output circuit of said one regulating generator to the field winding of each motor, circuit means connecting the field winding means for the second output circuit of the other of said pair of regulating generators to the first output circuit thereof, and circuit means connecting said second output circuit of said other regulating generator to energize said field winding of said main generator.

9. A motor control system comprising, a pair of mechanically connected motors, each having a rotor circuit and a field circuit, a variable voltage control source having an output circuit supplying said rotor circuits in parallel and having an input circuit, a first amplifier having an input circuit connected to one rotor circuit and having an output circuit, a second amplifier having an input circuit connected to the other rotor circuit and having an output circuit, a third amplifier having an input circuit differentially including said output circuits of said first and second amplifiers and having an output circuit connected to both motor field circuits, a fourth amplifier having an input circuit connected to said output circuit of said first amplifier and having an output circuit, and circuit means connecting said last named output circuit to said input circuit of said variable voltage control source.

10. A motor control system comprising, a pair of mechanically connected motors each having a rotor circuit and a field circuit, a variable voltage generator having an output circuit supplying said rotor circuits in parallel and having a field excitation circuit, a pair of current amplifiers having respective input circuits connected to said respective rotor circuits to be energized in dependence of current in the respective rotor circuits, each current amplifier having a current output circuit, a load balance amplifier having an input circuit connected in a loop circuit differentially including said current output circuits and having an output circuit connected to both motor field circuits to differentially control said motor field circuits, and electrical means responsive to load current of one motor rotor circuit and having an output circuit connected to said field excitation circuit of said variable voltage generator.

11. A motor control system comprising, a pair of mechanically connected motors each having a rotor circuit and a field circuit, a variable voltage generator having an output circuit supplying said rotor circuits in parallel and having a field excitation circuit, circuit means connected to one rotor circuit for producing a voltage proportional to load current in said one rotor circuit, circuit means connected to the other rotor circuit for producing a voltage proportional to load current in said other rotor circuit, circuit means having an output circuit connected to differentially energize said motor field circuits and having an input circuit energized by the difference of said voltages, and electrical means connected to respond to load current of one rotor circuit and having an output circuit connected to energize said field excitation circuit of said variable voltage generator.

12. Apparatus as set forth in claim 11 in which said last named output circuit comprises a source of voltage opposing the output of said electrical means.

References Cited in the file of this patent

UNITED STATES PATENTS

| Number | Name | Date |
|---|---|---|
| 1,684,236 | MacMillan | Sept. 11, 1928 |
| 2,285,673 | McShane | June 9, 1942 |
| 2,424,121 | Schlapfer | July 15, 1947 |

FOREIGN PATENTS

| Number | Country | Date |
|---|---|---|
| 220,551 | Germany | Dec. 22, 1908 |